United States Patent

Slana

[15] 3,668,291

[45] June 6, 1972

[54] PULSE CODE MODULATION MULTIPLEX SYSTEM

[72] Inventor: Matthew Francis Slana, Naperville, Ill.

[73] Assignee: Bell Telephone Laboratories, Incorporated, Murray Hill, N.J.

[22] Filed: Jan. 22, 1971

[21] Appl. No.: 108,791

[52] U.S. Cl. ....................179/15 AP

[51] Int. Cl. ....................H04j 3/04

[58] Field of Search ....................179/15 A, 15 AP, 15 BL

[56] References Cited

UNITED STATES PATENTS

| | | | |
|---|---|---|---|
| 3,492,432 | 1/1970 | Schimpf | 179/15 AP |
| 3,535,458 | 10/1970 | Gottfried | 179/15 BL |

*Primary Examiner*—Ralph D. Blakeslee
*Attorney*—R. J. Guenther and R. B. Ardis

[57] ABSTRACT

A multichannel pulse code modulation time division multiplex system samples the signals appearing in each of the channels substantially simultaneously at a predetermined rate and encodes the signal samples obtained from all of the channels substantially simultaneously with the aid of a clock pulse generator common to all channels, a repetitive staircase waveform generator common to all channels driven by the clock pulse generator, a separate pulse counter in each channel, a gate in each channel for supplying pulses from the clock pulse generator to the pulse counter, and comparison means in each channel to inhibit transmission through the gate whenever the staircase waveform exceeds the magnitude of the signal sample in the same channel.

3 Claims, 2 Drawing Figures

INVENTOR
M. F. SLANA
BY R B Ardis
ATTORNEY

PULSE CODE MODULATION MULTIPLEX SYSTEM

BACKGROUND OF THE INVENTION

This invention relates generally to pulse type communication systems and more particularly to multichannel pulse code modulation time division multiplex transmission systems.

In a multichannel pulse code modulation time division multiplex system, each channel is normally sampled in sequence at a predetermined sampling rate, the samples are combined in time division multiplex to form a single train of pulses of different amplitudes, and the samples are encoded in sequence by a pulse code modulation encoder serving all channels in common. The sampling is typically accomplished in each channel by a piece of apparatus known as a sample and hold gate, which not only obtains a substantially instantaneous sample of the signal content of its channel but also stores the amplitude of the sample over a somewhat longer period of time to facilitate the subsequent encoding process. In a system of this type, however, each sample can be held only for a maximum time interval of $1/ns$, where $n$ is the number of channels served by the common encoder and $s$ is the channel sampling rate. When the number of channels is large, therefore, the tolerances placed on each sample and hold gate are quite severe, since such short holding intervals require extremely short pulse rise and decay times.

One approach which has been taken in the past to combat the problem is that shown in U.S. Pat. No. 3,073,904, which issued Jan. 15, 1963, to C. G. Davis. There, separate precision encoding networks are used for odd and even numbered channels, with common timing circuitry used to control them. The result is a relaxation of the sampling gate tolerances by a factor of nearly two. While this approach can and does produce quite satisfactory results in systems with only a relatively small number of channels, it is not capable of coping satisfactorily with the problem in systems having a much larger number of time division multiplexed channels. Large scale duplication of the precision encoding network is economically prohibitive and the problem increases markedly in severity as the number of channels increases. In a single encoder system using an 8 kilohertz sampling rate and having 128 channels, for example, the maximum permissible sample holding interval is only 976 nanoseconds.

SUMMARY OF THE INVENTION

The present invention goes back to and makes use of one of the earliest known types of pulse code modulation encoders. That is the counter type of encoder shown, for example, in U.S. Pat. No. 2,272,070, which issued Feb. 3, 1942, to A. H. Reeves. In essence, a counter type of encoder employs a precision repetitive staircase waveform generator and counts the steps in the staircase waveform until the staircase waveform exceeds the magnitude of the signal sample being encoded. The final count is thus the binary number most closely representing the amplitude of the sample.

In accordance with the present invention, in a multichannel pulse code modulation time division multiplex system, all channels are sampled substantially simultaneously instead of in succession at a predetermined rate and the resulting samples are encoded substantially simultaneously in a counter type encoder having separate logic elements in each channel but only a single precision staircase waveform generator common to all channels. The per-channel logic elements include only such components as differential detectors, gates, and counters, which are relatively simple, inexpensive, and easy to manufacture. The circuitry requiring a high degree of precision, principally the staircase waveform generator, serves all channels in common. Because sampling and encoding take place substantially simultaneously in all channels, rather than in sequence for each individual channel, the relaxation of sample and hold gate tolerances may reach a factor as high as the total number of channels in the system. Thus, even in a 128 channel system, a sample can be held for a time interval approaching $1/s$, or 125 microseconds. Conventional digital multiplexing techniques can be used to combine the encoded signals for all channels on a single path for transmission.

A significant advantage obtained through use of the present invention is the ability to provide any desired compression curve in the encoding process by controlling the relative heights of the steps produced by the staircase waveform generator. Almost complete freedom of compression curve choice is available, as opposed to the much more limited choice available when conventional network encoding techniques are employed. The reverse procedure may, of course, be used to provide the inverse expansion characteristic in the pulse code modulation decoder.

DETAILED DESCRIPTION

Figure 1:
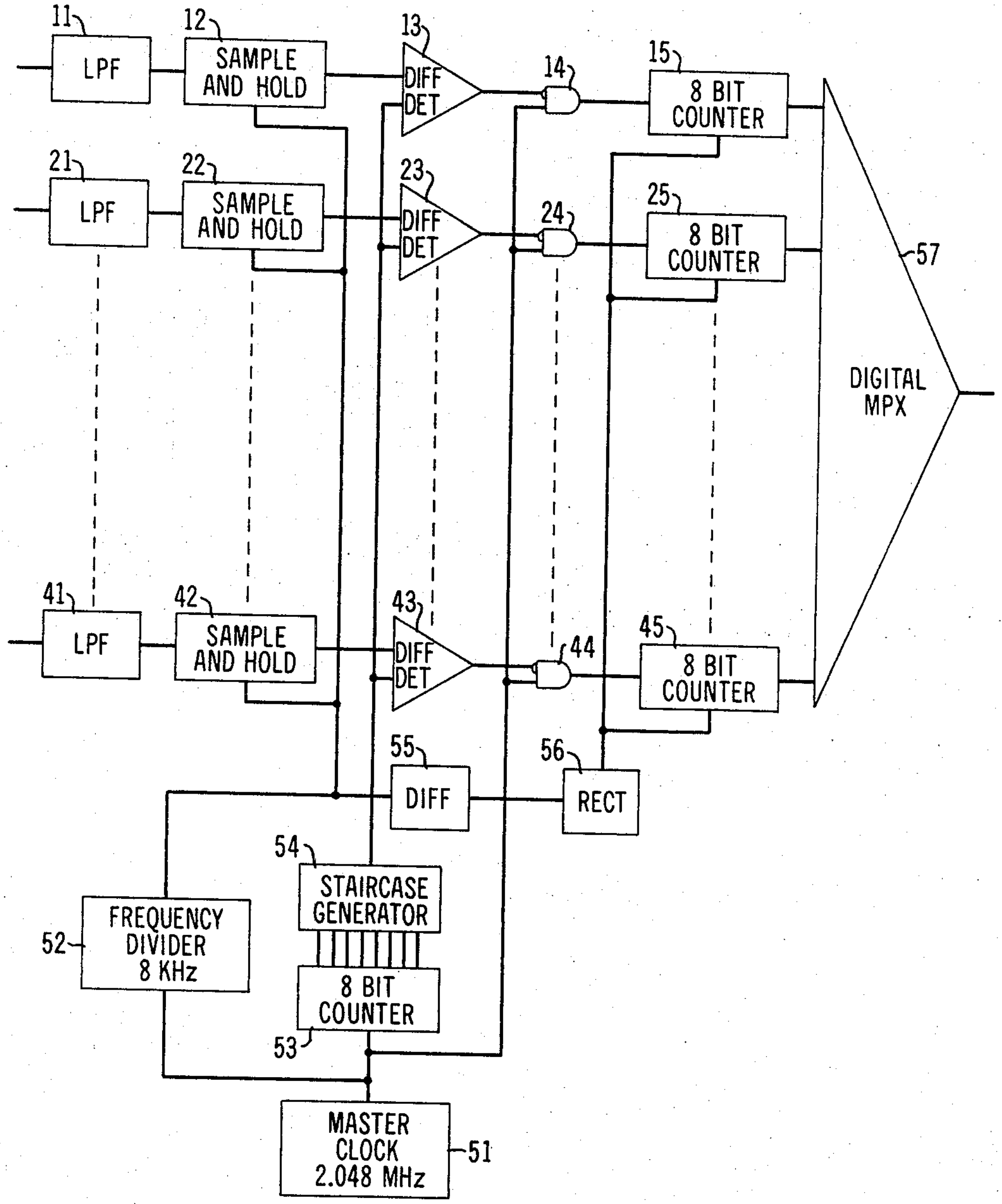
FIG. 1 is a block diagram of the transmitter of a specific multichannel pulse code modulation time division multiplex system embodying the invention.

The multichannel pulse code modulation transmitter illustrated in FIG. 1 is particularly well suited for combining large numbers of voice frequency telephone channels in time division multiplex. In the illustrated transmitter, the first channel to be encoded is connected to a low-pass filter 11, which serves to limit the band of frequencies accepted to approximately 4 kilohertz. The band-limited signals from filter 11 are supplied to a sample and hold gate 12, which serves not only to sample the signal amplitude at an 8 kilohertz rate but also to extend the length of the sample over a somewhat longer time interval to permit encoding to take place. The held or stretched sample is, in turn, applied to the first of two input terminals of a differential detector 13. In a manner which will be described later, a stepped amplitude standard is applied to the second input terminal of detector 13 and detector 13 generates an output whenever the amplitude standard is greater in magnitude than the signal amplitude sample. The output from differential detector 13 is applied to the inhibit terminal of an INHIBIT gate 14, which passes pulses applied to its transmission input terminal only as long as nothing is applied to its inhibit terminal. Finally, the output of INHIBIT gate 14 is supplied to drive an eight-bit binary counter 15.

The remaining channels in the pulse code modulation encoder shown in FIG. 1 are like the first. The second is made up of low-pass filter 21, sample and hold gate 22, differential detector 23, INHIBIT gate 24, and eight-bit binary counter 25. None of the remaining channels are shown but the last, which includes low-pass filter 41, sample and hold gate 42, differential detector 43, INHIBIT gate 44, and eight-bit binary counter 45. Similar component circuits are substantially identical in all channels.

By way of example, a total of 128 channels are encoded in the embodiment of the invention illustrated in FIG. 1. The encoding is accomplished substantially simultaneously in all channels under the control of a common master clock 51. For a 128-channel system, master clock 51 generates timing pulses at a 2.048 megahertz rate. To drive the sample and hold gates 12, 22, . . . 42, the output from master clock 51 is supplied to a frequency divider 52, which counts down to 8 kilohertz. The 8 kilohertz output from frequency divider 52 is the channel sampling rate and is supplied to the control or switching terminals of sample and hold gates 12, 22, . . . 42. At the same time, the 2.048 megahertz output from master clock 51 is fed directly to both an 8-bit binary counter 53 and the transmission input terminals of INHIBIT gates 14, 24, . . . 44.

Counter 53 in FIG. 1 is provided with eight parallel output leads which are, in turn, connected to drive a staircase waveform generator 54. Staircase generator 54 is a conventional repetitive waveform generator which, under the control of eight-bit counter 53, produces a 256 step staircase waveform which repeats itself at an 8 kilohertz rate which is, of course, the channel sampling rate of the illustrated system. The output waveform from staircase generator 54 is supplied to the second of the two input terminals of each of differential detectors 13, 23, . . . 43. Finally, the 8 kilohertz output from frequency divider 52 is supplied through a differentiator 55 and a half-wave rectifier 56 to the reset controls of eight-bit binary counters 15, 25, . . . 45.

In the embodiment of the invention illustrated in FIG. 1, all of sample and hold gates 12, 22, . . . 42 are operated substantially simultaneously and in synchronism. The 8 kilohertz output from frequency divider 52 is shown as waveform A in FIG. 2. This waveform serves to open each gate at the beginning of each sampling interval and the holding circuitry within each sample and hold gate effectively stretches the time duration of the resulting sample to extend over most of the rest of the time remaining before the beginning of the next sampling interval. For an 8 kilohertz sampling rate, the length of each sample can thus be extended for a time interval approaching 125 microseconds.

Differentiator 55 and half-wave rectifier 56 operate from frequency divider 52 to supply reset pulses to binary counters 15, 25, . . . 45 which are synchronized with the leading edges of the pulses operating sample and hold gates 12, 22, . . . 42. The reset pulses are shown as waveform B in FIG. 2.

Figure 2:
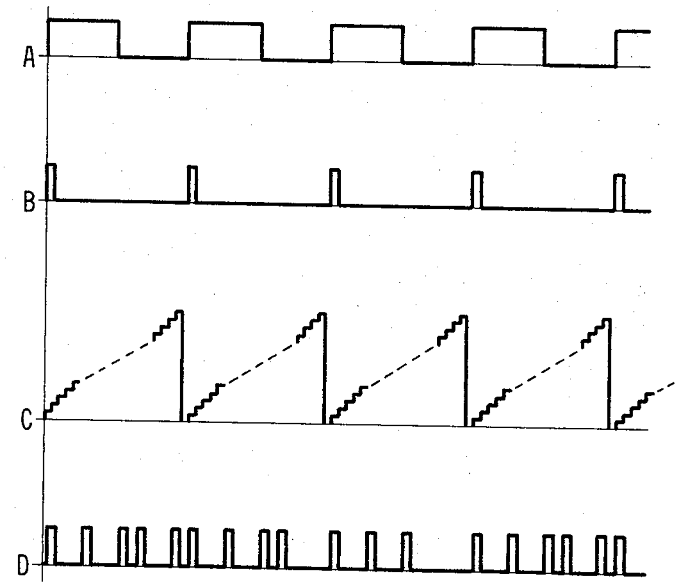
FIG. 2 is a group of waveforms illustrating operation of the embodiment of the invention shown in FIG. 1.

The repetitive staircase waveform supplied to differential detectors 13, 23, . . . 43 from staircase generator 54 is shown as waveform C in FIG. 2. This staircase waveform is also synchronized with the pulses operating sample and hold gates 12, 22, . . . 42 and, during each encoding interval, provides the standard for comparison in each channel with the signal amplitude sample being encoded. In each of differential detectors 13, 23, . . . 43, the signal amplitude sample is compared with the amplitude of the staircase waveform on a step-by-step basis. As eight-bit binary counter 54 counts from zero and the amplitude of the staircase waveform increases step by step, timing pulses from master clock 51 are supplied to the transmission inputs of INHIBIT gates 14, 24, . . . 44. As long as the instantaneous amplitude of the staircase waveform remains equal to or less than the amplitude of the signal sample in a particular channel, no output is generated by that channel's differential detector. As soon as the instantaneous amplitude of the staircase waveform exceeds that of the sample, however, the differential detector generates an output which is applied to the inhibit input of the channel's INHIBIT gate.

Encoding is thus accomplished in each channel in the embodiment of the invention illustrated in FIG. 1 by the counting action of eight-bit binary counters 15, 25, . . . 45. Timing pulses from master clock 51 are supplied to each counter through its associated INHIBIT gate to advance the counter until the staircase waveform exceeds the amplitude of the signal sample being encoded. At that point, further transmission of timing pulses is blocked by the INHIBIT gate and the counter stops at the binary number most nearly representative of the amplitude of the signal sample. At the end of the sample and hold interval, all of counters 15, 25, . . . 45 are reset to zero by the pulse from half-wave rectifier 56.

In the embodiment of the invention illustrated in FIG. 1, pulse code modulation code groups representative of the signals being encoded in each channel appear in parallel form at counters 15, 25, . . . 45. Waveform D in FIG. 2 is representative of the code groups appearing at any particular counter during successive sampling and encoding intervals. Eight-bit encoding is employed for maximum accuracy. The outputs from all of the eight-bit binary counters 15, 25, . . . 45 are supplied to appropriate conventional digital multiplexing equipment 57 for combination in the time domain. The output from multiplexing equipment 57 is thus a conventional pulse code modulation pulse train in which a code group representing an encoded sample from the first channel is followed by one representing an encoded sample from the second channel and so on.

The effect of the present invention upon the permissible tolerances on sample and hold gates 12, 22, . . . 42 is shown quite dramatically in the 128-channel pulse code modulation transmitter illustrated in FIG. 1. Absent the invention, in a system in which each channel is sampled and encoded in sequence, each sample could be held for a maximum time interval of only 976 nanoseconds. Extremely short pulse rise and decay times would be required. With the aid of the present invention, each sample can be held for a much longer time interval approaching 125 microseconds and the pulse rise and decay time restrictions are relaxed to a corresponding degree.

The present invention permits the above-described relaxation of sampling gate tolerances, furthermore, in an economically attractive manner and with a minimum of circuit complexity. The per-channel portions of the counter-type encoder employed in the embodiment illustrated in FIG. 1 include differential detectors 13, 23, . . . 43, INHIBIT gates 14, 24, . . . 44, and counters 15, 25, . . . 45. All are relatively simple and straightforward circuits in which extreme precision is not required. The only precision circuits needed are staircase generator 53, which is driven by eight-bit binary counter 54, and master clock 51. These circuits, however, serve all 128 channels in common and, for this reason, require no expensive duplication.

Staircase generator 54 may be fixed to provide uniform amplitude steps if a linear encoding characteristic is desired. Steps of differing amplitude may, however, be readily employed if it is desired to incorporate signal compression into the encoding process. As has already been pointed out, an important advantage obtained through the use of a counter-type of encoder is the substantially complete freedom of compression curve choice permitted. As in most conventional staircase waveform generators, all that need be done to provide any desired staircase slope or combination of slopes is adjust the network of resistances which controls those slopes. The reverse procedure may be employed at the pulse code modulation decoder to provide an inverse expansion characteristic.

What is claimed is:

1. In a pulse code modulation transmission system which includes a plurality of signal channels, means to sample the signal appearing in each of said channels substantially simultaneously at a predetermined rate and means to encode the signal samples obtained from all of said channels substantially simultaneously which comprises a repetitive staircase waveform generator common to all of said channels and means associated with each of said channels to count the steps in the staircase waveform provided by said generator until said staircase waveform exceeds the magnitude of the signal sample in the same channel.

2. A pulse code modulation transmission system in accordance with claim 1 in which said staircase waveform generator is repetitive at said predetermined sampling rate.

3. A pulse code modulation transmission system in accordance with claim 2 in which said counting means includes a clock pulse generator common to all of said channels connected to drive said staircase waveform generator at the rate of one step per clock pulse, a separate pulse counter in each of said channels, a gate in each of said channels supplying pulses from said clock pulse generator to said pulse counter, and comparison means in each of said channels to inhibit transmission through said gate whenever said staircase waveform exceeds the magnitude of the signal sample in the same channel.

* * * * *